United States Patent [19]
Arakawa

[11] Patent Number: 5,024,857
[45] Date of Patent: Jun. 18, 1991

[54] METHOD FOR COATING THE ARMATURE OF A ROTARY ELECTRIC APPARATUS

[75] Inventor: Ikuo Arakawa, Omama, Japan

[73] Assignee: Mitsuba Electric Manufacturing Co., Ltd., Gunma, Japan

[21] Appl. No.: 480,128

[22] Filed: Feb. 14, 1990

[30] Foreign Application Priority Data

Feb. 14, 1989 [JP] Japan .................... 1-34099

[51] Int. Cl.⁵ .............................. C23C 26/00
[52] U.S. Cl. ...................... 427/104; 427/236
[58] Field of Search .................. 427/104, 236

[56] References Cited

U.S. PATENT DOCUMENTS

| | | | |
|---|---|---|---|
| 2,822,483 | 2/1958 | De Jean | 427/104 |
| 2,837,669 | 6/1958 | Fisher | 427/104 |
| 4,154,896 | 4/1979 | Sattler | 427/104 |
| 4,160,178 | 7/1979 | Smith | 427/104 |

FOREIGN PATENT DOCUMENTS

| | | | |
|---|---|---|---|
| 214749 | 9/1986 | Japan | 427/104 |
| 773846 | 10/1980 | U.S.S.R. | 427/104 |

Primary Examiner—Shrive Beck
Assistant Examiner—Vi Duong Dang
Attorney, Agent, or Firm—Oliff & Berridge

[57] ABSTRACT

A method for coating an armature of a rotary electric apparatus conducts the coating process step by step in first and second processes for coating the external circumference of an armature with a coating material. The second coating process is conducted after the first coating material already coated by the first coating process is gelled to a hardened state.

3 Claims, 6 Drawing Sheets

METHOD FOR COATING THE ARMATURE OF A ROTARY ELECTRIC APPARATUS

BACKGROUND OF THE INVENTION

The present invention relates to a method for coating the armature of a rotary electric apparatus such as a motor.

In such a rotary electric apparatus, it is necessary, in general, to prevent expansion and compression of a coil inserted into a slot due to centrifugal force generated during high speed rotation of an armature and therefore a device is integrated to a solid and rigid unit by coating the surface thereof with a coating material such as an epoxy resin group bonding agent, etc. Such coating process has been conducted in the following single coating and hardening procedure (FIG. 6). Namely, the coating material is applied for the coating purpose on the coating area such as a coil of a preheated armature and the coating material is then hardened by heat treatment. However, if a coating material of a low viscosity is used, in this method, for impregnation of the coating material into every corner including the narrow areas between the coils and the deep areas of the slot, a considerable part of the coating material to be impregnated drips because it has a low viscosity, resulting in a problem that the coating process does not provide the device with the necessary strength. Meanwhile, utilization of a material having a high viscosity causes a problem in that the coating does not impregnate into the narrow and deep areas of the armature. Therefore, the coating process has been conducted with a coating material having a compromise viscosity.

SUMMARY OF THE INVENTION

Considering such background, the present invention has been proposed to provide a method for coating an armature of a rotary electric apparatus which can solve these problems and is characterized in conducting the coating process of the coating material step by step in first and second processes for first coating the external circumference of armature with a coating material and then conducting the second coating process at a time when the coating material already coated in the first coating process is gelled to a hardened state.

With such constitution, the present invention has realized the coating process wherein the coating material in the necessary quantity can be reliably impregnated into the deep areas of the coil.

BRIEF DESCRIPTION OF THE DRAWINGS

The invention will be described with reference to the following Figures wherein.

DETAILED DESCRIPTION OF THE PREFERRED EMBODIMENTS

Figure 1:
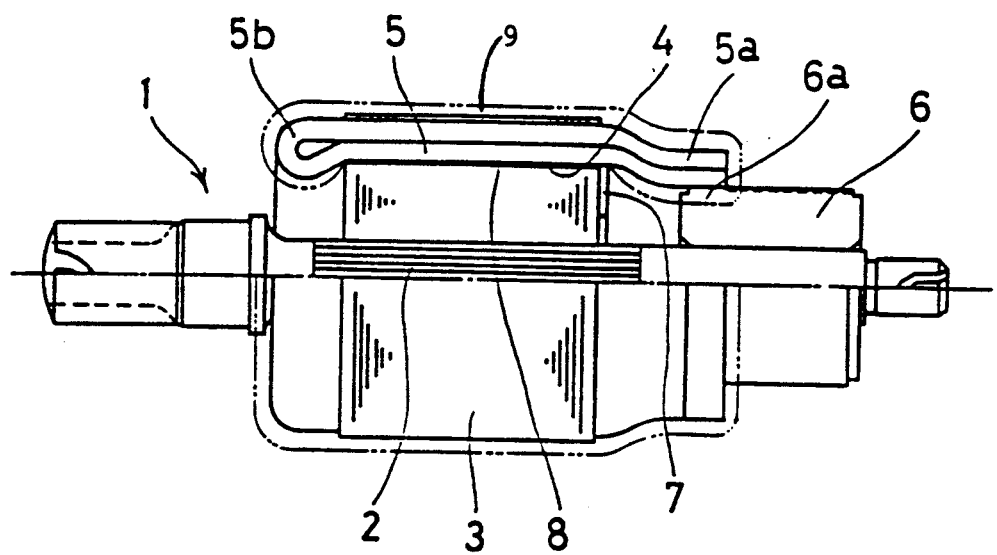
FIG. 1 is a side elevation of an armature.

Next, a preferred embodiment of the present invention will be explained with reference to the accompanying drawings. In the drawings, the reference numeral 1 designates an armature of motor. This armature is formed, like the prior art, by an armature shaft 2, a core 3 engaged with the armature shaft 2 and integrally rotating with the armature shaft 2, a coil 5 wound to the slot 4 of the core 3 and a commutator 6 which is slidably placed in contact with a brush (not illustrated). Reference numeral 6a designates a riser where the end part of coil 5 is connected to the commutator 6; reference numeral 5a designates a coil bridge extending from the riser 6a to the core 3; reference numeral 5b designates a coil end protruded from the end face of core 3 in the end side; reference numeral 7 designates a side insulator; and reference numeral 8 designates an insulating paper within the slot. Here, in armature 1, it is determined in the design concept that the coating process is conducted on the coil bridge 5a, coil end 5b, riser 6a, inside and outside of slot 4, side insulator 7 and insulating paper 8.

Figure 2:
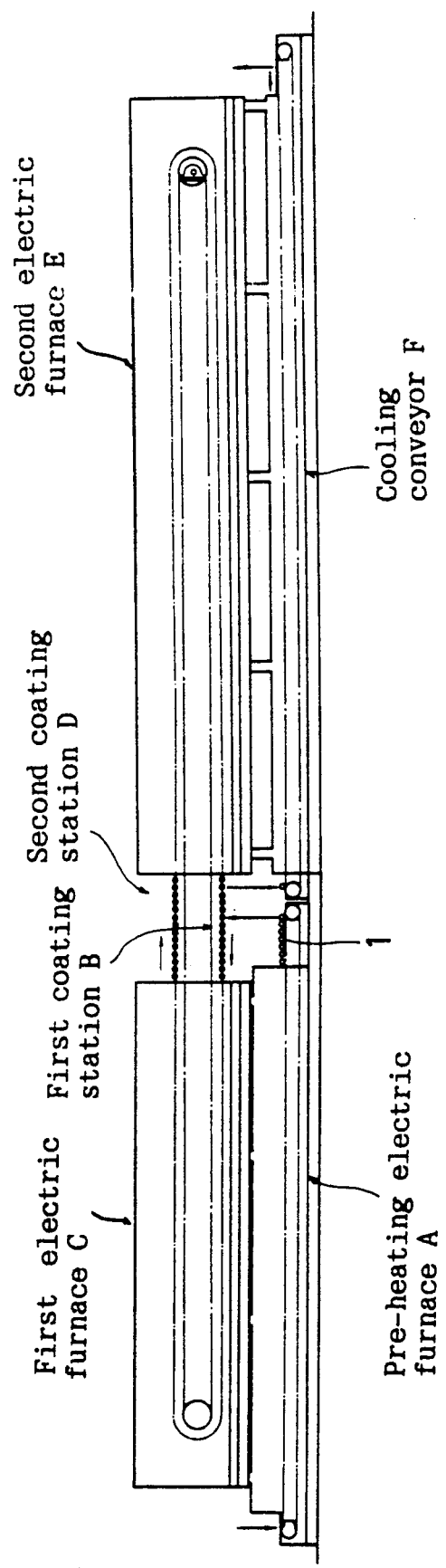
FIG. 2 is a diagram indicating the coating process for the armature.
Figure 3:
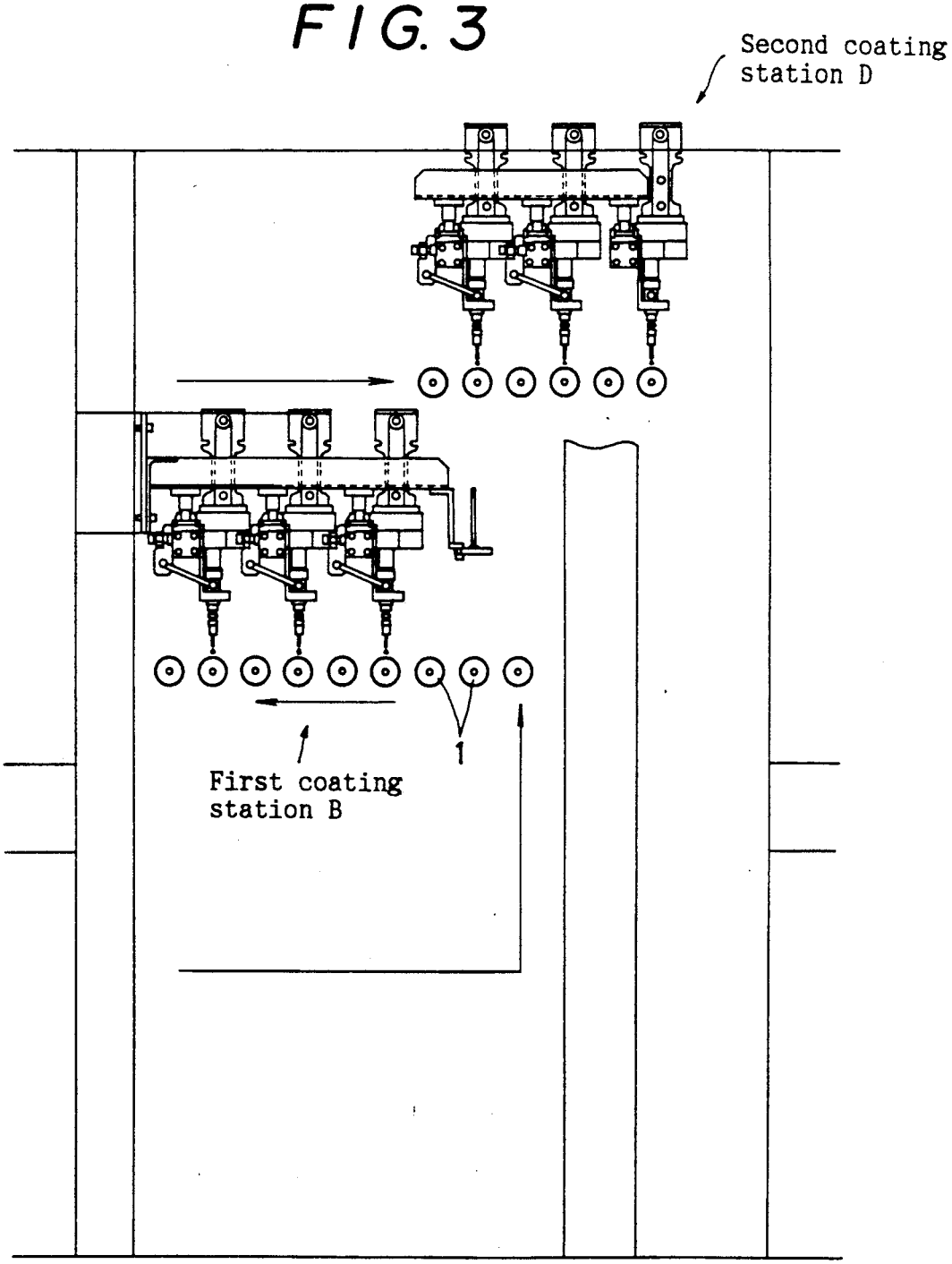
FIG. 3 is a front elevation of the first coating station and second coating station.
Figure 4:
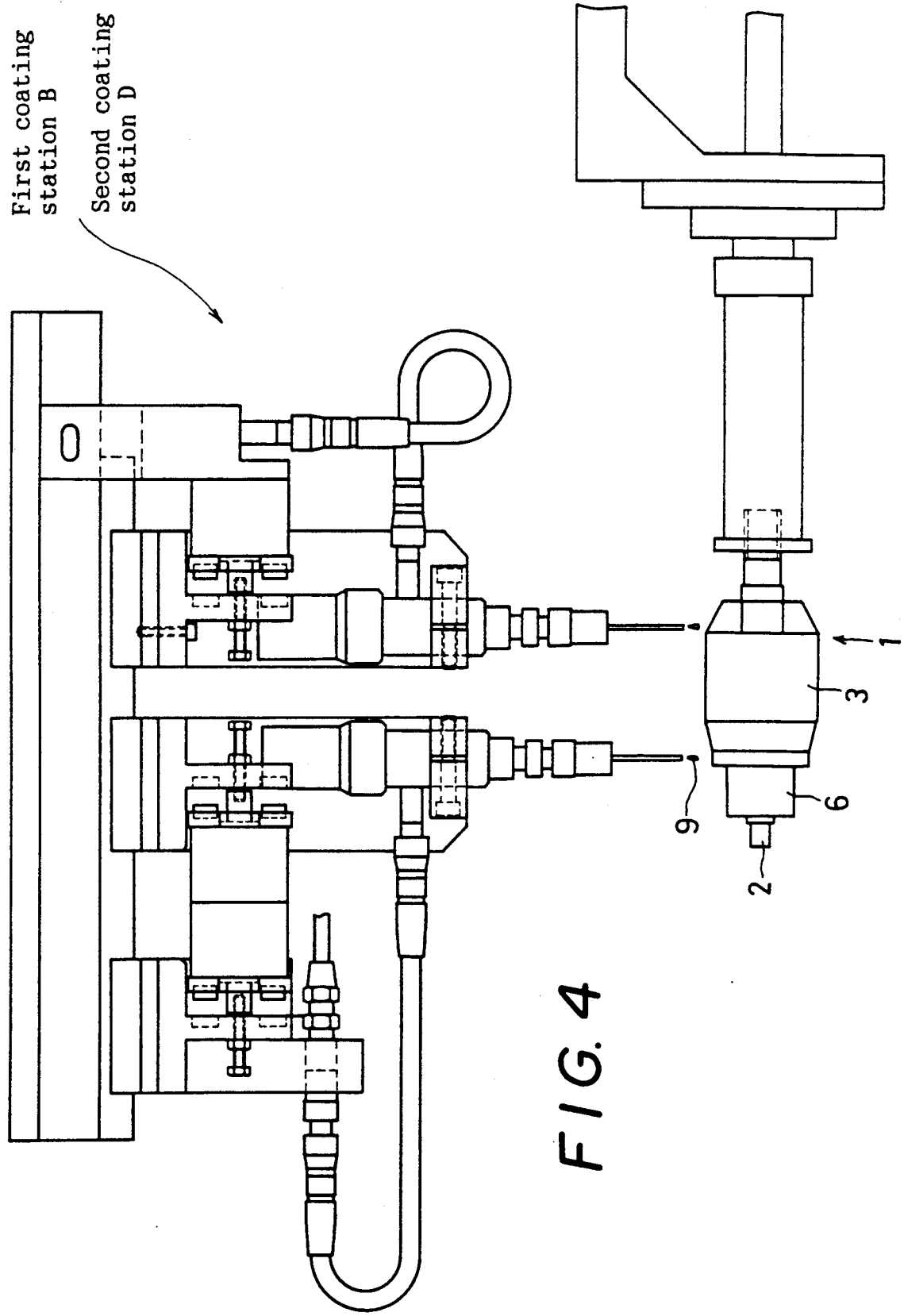
FIG. 4 is an enlarged diagram of the essential portion of such coating stations.
Figure 5:
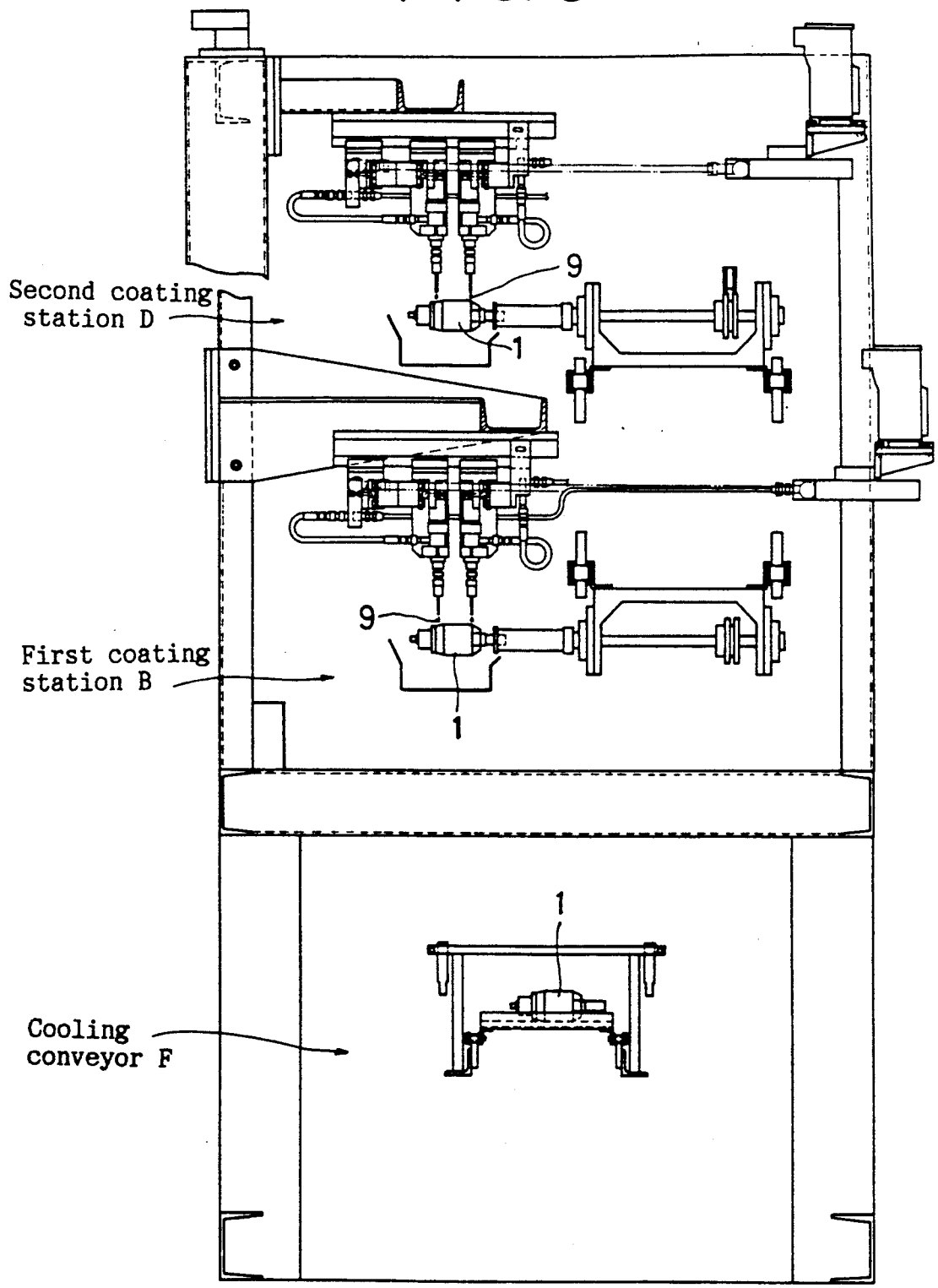
FIG. 5 is a side elevation of the first coating station, second coating station and cooling conveyor.
Figure 6:
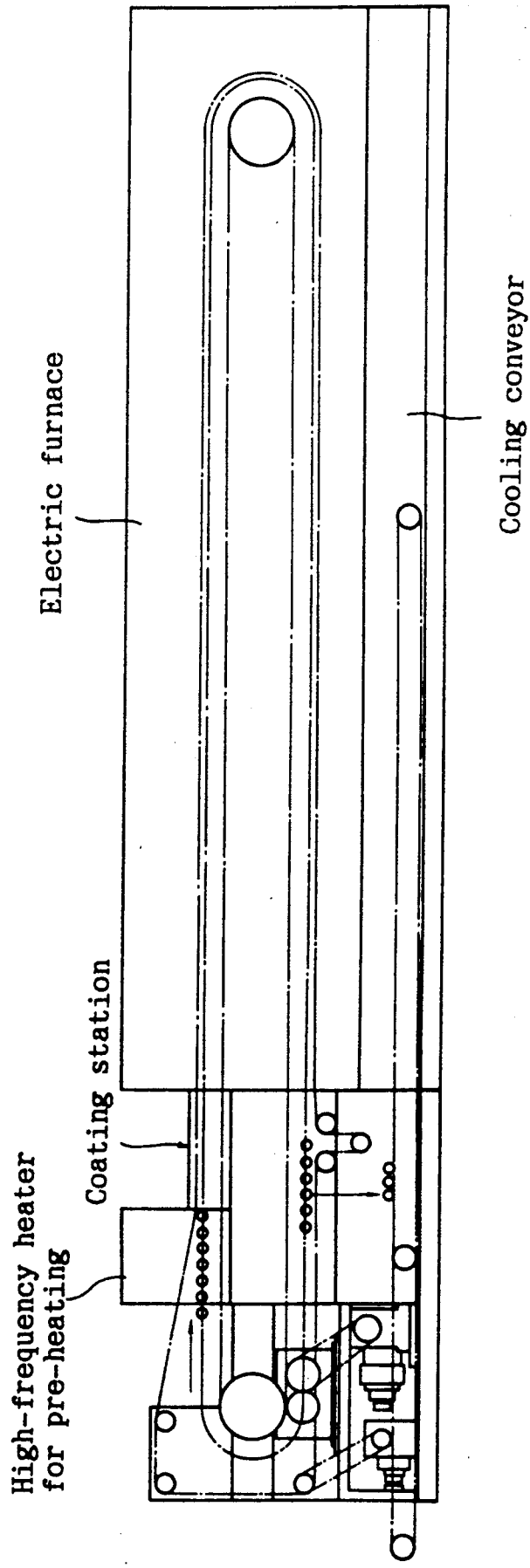
FIG. 6 is a diagram for explaining the coating process of the prior art.

The numeral 9 designates a coating material to be coated to the necessary area of coil 5. In this embodiment, a liquid type epoxy group thermosetting resin is used as the coating material 9. The coating process by this coating material 9 is conducted as explained hereunder with reference to FIGS. 2–5. Namely, the armature 1 passes through the coating process route preset for transportation by a conveyor while it is rotated about the armature shaft 2. In this process, the armature 1 is preheated by a pre-heating electric furnace A for pre-heating (in the preferred embodiment, temperature is set to 110° C.–130° C.). Thereafter, the coating material 9 of a predetermined quantity is applied for impregnation into portions of the pre-heated armature 1 such as the coil 5 on both external sides of core 3 in the first coating station B. Then, the armature 1 is caused to pass through the first electric furnace C (in this embodiment, temperature is set to 130° C.–150° C.). Thereby, the armature 1 having completed the first coating process is heated in order to sufficiently impregnate the deep areas of the coil 5 with the coating material 9 and institute the thermosetting process. In the stage where the coating material 9 is gelled to a hardened state, the armature 1 is taken out from the first electric furnace C and then sent to the second coating station D in which the second coating material 9 is applied onto the coating area of the armature 1. Thereafter, the armature 1 is sent to the second electric furnace E (in this embodiment, temperature is set to 150° C.). Here, the final thermosetting process is carried out on the coating material 9. Thereafter, the armature 1 is sent to the cooling conveyor F for cooling. Thereby, the armature 1 is integrally formed as a solid and rigid apparatus by the hardened coating material 9.

In the embodiment of the present invention constituted as explained above, on the occasion of the coating process to the armature 1 with the coating material 9, the first coating process by the coating material 9 is carried out on the armature 1 in the preheating stage, and the second coating process by the coating material 9 is further conducted in the stage where the coating material 9 coated in the first coating process is gelled.

As described above, in the present invention, the coating material 9 is coated on the armature 1 in a stepby-step coating process divided into first and second coating processes. In this case, the second coating process is conducted when the coating material 9 coated in the first coating step is gelled. Accordingly, in the first coating material 9 coating process, a small quantity of coating material 9 is coated under low viscosity conditions in the initial coating process and the coating material 9 impregnates the small clearance areas between the coil 5, and deep areas of the slot 4. The first coating material 9 is then gelled so that it does not drip, the second coating material 9 is coated, in the necessary quantity, up to the large clearances and the surfaces not coated in the first coating process and the coating material 9 is finally hardened by heat processing.

Therefore, the coating material 9 is applied repetitively on the armature 1. In this case, the deep areas and small clearances of the armature 1 are impregnated by the coating material 9 in the first coating process and succeeding gelating process, and thereafter the second coating process is conducted while keeping the gelled condition. Accordingly, unlike the conventional coating process, the deep area is also impregnated by the coating material 9. Moreover, the surface is coated with the necessary quantity of the coating material 9. Thereby, a reliable and high quality armature 1 having high rigidity can be provided by the present invention.

In addition, since the second coating process is carried out under the condition that the coating material 9 coated in the first coating process is gelled, compatibility with the newly coated coating material 9 is excellent, any drop of coating material 9 can be prevented, and moreover there is no chance that the coating material 9 is not hardened under the condition that it is divided into two layers. Thereby, a high performance armature 1 having excellent strength and vibration proof and spinning proof characteristics can be provided.

The coating material is not limited only to a liquid material since a powder type coating material can also be used. Moreover, the same material or different materials may be used in the first and second coating processes. In this case, it is possible, for example, that the material used for the first coating process has a low viscosity and the material used for the second coating process has a high viscosity.

In short, since the present invention has been constituted as explained above, on the occasion of coating the surface of armature, the coating material is coated step by step wherein the material of the second coating process is coated on the gelled material used in the first coating process. Accordingly, the second coating process is carried out under the condition that the first coating material impregnates into the narrow areas between the coils and deep areas of the slot by the first coating process and is hardened so that it does not drop therefrom, the material being then hardened by heat processing. Therefore, the coating material is used effectively for the coating without dripping from the coating area, unlike the prior art where only the single coating operation is carried out. Thereby, the armature completes the necessary coating process through impregnation of material up to the narrow and deep areas. In addition, due to avoidance of separation of the coating material coated by the double coating processes into two layers and good compatibility of material, a high performance armature having excellent strength, and vibration proof and spinning proof characteristics can be provided.

What is claimed is:

1. A method for coating coils and slots of an armature of a rotary electric apparatus comprising the steps of:
    dropping a first coating material onto deep areas within the slots and narrow areas between the coils of the armature;
    heating the first coating material to a gelled state to prevent said first coating material from dripping off of said armature;
    dropping a second coating material onto the coils and slots of the armature after the first coating material is gelled; and
    hardening said first and second coating materials on said armature.

2. The method of claim 1, wherein the first coating material has a lower viscosity than the second coating material.

3. The method of claim 1, wherein the first coating material differs in composition from the second coating material.

* * * * *